No. 626,323. Patented June 6, 1899.
L. E. FOURNIER & S. E. WINDER.
CHECKING OR UNCHECKING DEVICE.
(Application filed Feb. 6, 1899.)
(No Model.)
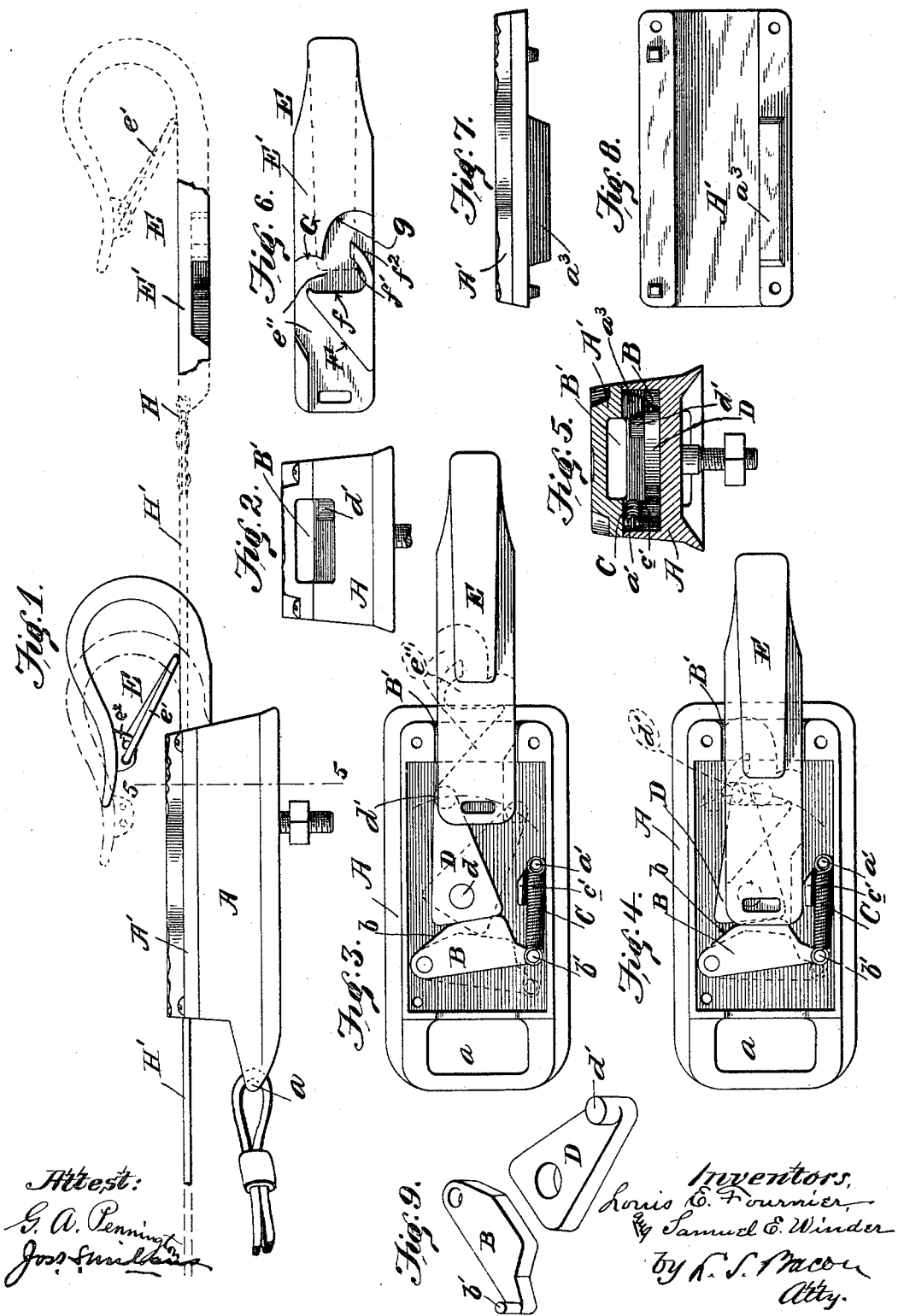
Inventors,
Louis E. Fournier,
Samuel E. Winder
Attest:
G. A. Pennington

UNITED STATES PATENT OFFICE.

LOUIS E. FOURNIER AND SAMUEL E. WINDER, OF EVANSVILLE, INDIANA.

CHECKING OR UNCHECKING DEVICE.

SPECIFICATION forming part of Letters Patent No. 626,323, dated June 6, 1899.

Application filed February 6, 1899. Serial No. 704,686. (No model.)

*To all whom it may concern:*

Be it known that we, LOUIS E. FOURNIER and SAMUEL E. WINDER, citizens of the United States, residing at Evansville, in the county of Vanderburg and State of Indiana, have invented certain new and useful Improvements in Holding or Releasing Devices; and we do hereby declare the following to be a full, clear, and exact description of the invention, such as will enable others skilled in the art to which it appertains to make and use the same.

This invention relates to an improvement in holding and releasing devices designed more particularly for use as a checking and unchecking device, although not necessarily limited to that particular use.

The invention is embodied in the construction and arrangement of parts hereinafter described, and defined in the claims.

Generally speaking, the object of the invention is to provide a device whereby upon backward movement of the checking-hook the same can be locked against forward movement and by further rearward or backward movement the same is released, so that forward movement is permitted.

We believe that a device possessing the above-suggested features is broadly new in the art of checking and unchecking devices, and we wish it also understood that the device can be used and is broadly new, so far as we are able to find, in the art of holding and releasing devices.

In the drawings we have shown a form of the invention which has been found to be eminently satisfactory. It is, however, to be understood that the particular details and arrangement shown are not necessarily the only embodiment or arrangement of the invention that can be made and would therefore have it understood that the form shown in this specification is for the purpose of illustration and description rather than for the purpose of limitation.

Figure 1 is a side elevation of the device, showing in dotted lines the hook extended, the extended figure of the hook being shown partly in elevation. Fig. 2 is an end view looking from the front. Fig. 3 is a top plan view with the top removed. Fig. 4 is a similar view showing the hook in its locked position. Fig. 5 is a cross-section on the line 5 5 of Fig. 1. Fig. 6 is a bottom plan view of the hook proper. Fig. 7 is a side elevation of the cover-plate. Fig. 8 is a bottom plan view of the same, and Fig. 9 is a detached perspective view of the locking dog and lever.

In the drawings, A represents the housing or casing, having at its base a suitably-threaded bolt with its associated nut, by which the device is attached to the saddle of the harness or any other convenient place. The end of this casing has a loop $a$, to which the back strap may be attached. The casing has a hollow interior or chamber, in which is pivotally secured a lever B, the pivot of the lever being located adjacent one side wall of the casing. This lever has a cam-shaped forward face $b$, and its opposite end is formed with a pin or lug $b'$, over which the end of the coil-spring C is passed, the spring being secured to a fixed pin $a'$ on the casing arranged in advance or forward from the end of the lever. Located at the side of the spring is a guard-plate $c'$, forming in conjunction with the side of the casing a holding-seat for the spring. The tendency of the spring is to move the lever B forward on its pivot.

Mounted on a suitable stationary pin $d$ in advance of the lever B is a triangular-shaped locking-dog D, having a squared rear edge resting normally against the cam edge of the lever B and having an upwardly-projecting pin or lug $d'$ at its forward end. The dog is pivoted on the pin and by virtue of the peculiar construction of the cam edge of the lever is held with its lug end at one side of the chamber, as shown in Fig. 3. The chamber has an opening B' at its forward end and a corresponding opening in the rear, the rear opening, however, being of less width than that of the front.

To maintain the lever and dog in position on their respective pivot-pins, we provide on the under side of the cover-plate A' a depending flange $a^3$, which is of the width sufficient to project over the pivoted end of the lever and the edge of the dog, as shown in Fig. 5. This cover-plate is made with a channeled under face extending longitudinally and serves, in conjunction with the chambered portion of the casing, as a passage-way through which the strap and end of the hook pass. The cover-plate is secured to the casing in any convenient manner.

E designates the check-hook, having a spring-actuated securing-tongue $e'$. This hook is formed with the broad flatened shank E', on the under side of which are formed the cam-grooves $e''$. The formation of the cam-grooves with the shank of the hook is of prime importance, and to enable a complete understanding of the working of the invention we shall describe the same with reference to the contour with the walls thereof. The groove opens through the back and through the opposite sides of the shank, as shown in Fig. 6. The forward wall F of the rear portion of the groove is inclined, the inclinations starting from the rear at one side and continuing to a point adjacent to but a slight distance from the opposite side, the inclinations being forward. At that point a direct turn is made and a right-angle shoulder $f$ is formed, which may be properly termed the "locking-shoulder." The wall continues with a forward and backward curve, as at $f'$, and is thence carried directly forward and curved backward in an opposite direction, forming the rear wall, as at $f^2$, to the side opening of the front end of the groove. Directly in front of the end $f^3$ of the wall is a curved abutment or seat G, the inner end of which is located in line with a portion of the locking-shoulder beyond the end thereof, so that the end of the inclined wall F may be stated as being in direct line with the center of this curved seat, as plainly shown in Fig. 6. From the inward end of the curved seat a curved wall $g$ is formed, constituting an outer or forward end wall of the cam-grooves. The extreme outer end of this curved wall is dipped or carried backward somewhat for the purpose to be presently stated. The particular constructions of these various walls are clearly shown in dotted lines in Figs. 3 and 4 and full lines in Fig. 6, the rear portion of the groove being practically straight, as shown, and the hook at that point is formed with an eye through which a suitable metallic strap H is passed, to which the manipulating-strap H' is attached, it being understood that this manipulating-strap is carried back to a point where the driver or attendant can easily grasp and manipulate the same.

In operation, the parts being in position, as shown in Fig. 3, the attendant, wishing to check the horse, draws back on the manipulating-strap, which carries the shank of the hook into an open end of the chamber in the casing, and the inner edge of the inclined wall F is brought into direct engagement with the pin of the end of the dog. A continued backward movement of the hook forces the dog over to the opposite side of the casing, carrying the spring-actuated lever backward by virtue of the shape of the inner end of the dog. The movement of the dog is continued until the pin arrives at the end of the inclined wall F, and a continued backward movement of the hook carries the pin directly onto the curved seat G, and a further backward movement of the hook is prevented. While in this position, the pin being seated in the curved seat, as the pressure is released on the manipulating-strap the spring will tend to right the pawl or carry it to its normal position to the side of the casing, and will therefore move the hook slightly forward, owing to the curvature of the seat, and will assume a position directly in front of the locking-shoulder $f$. In this position it will be readily seen that the hook cannot be moved forward, but is locked. When it is necessary to release the hook, so that the same can be drawn out into the position shown in dotted lines, Fig. 1, it is only necessary for the attendant to again draw the manipulating-strap backward, which will carry the pin on the end of the dog into the end of the cam-groove, the same being guided thereinto by the curved wall $f'$. The tendency of the spring is always to carry the pin and the dog toward the lower edge of the shank, as shown in Fig. 6, and therefore as soon as the pin escapes the shoulder $f'$ and is forced onto the curved opposite end of the wall $g$ the pin will escape from the side of the shank and the hook can be readily drawn out of the casing. By this construction it will be noticed that a manipulation of the hook requires an intermittent movement—namely, first a backward movement, which is interrupted by the pin striking the curved seat G. Then by releasing the pressure on the strap the hook, which is automatic, is moved slightly forward, the locking-pin on the dog assuming a position in front of the locking-shoulder having been moved laterally. A further backward movement releases the pin, thus necessitating three separate steps to lock and release the hook. When the hook is in the casing, the shank has a clear passage-way in the space above the dog and lever and within the channel of the cover-plate.

It is apparent that other means can be employed for maintaining the spring-pressure on the dog and that various other alterations and changes can be made without departing from the nature and scope of the invention.

The tongue $e'$ is formed of a bent strip of spring-wire having its ends bent in opposite directions, one end being loosely placed in a horizontal perforation in a depending lug $e^2$, while the opposite end is placed in a corresponding perforation in advance of the other. This arrangement tends to force the tongue to a vertical position, and this holds the same against the base of the hook, as shown. The yielding nature of the material permits the tongue being raised.

Having thus described the invention, what is claimed as new, and desired to be secured by Letters Patent, is—

1. In a holding and releasing device, the combination with a casing, of a spring-actuated holding-dog therein, and a hook member having a transversely-inclined wall, a stop and a locking-shoulder thereon with which the dog engages, substantially as described.

2. In a holding and releasing device, the combination with the casing and an independently-movable attaching device or hook, of means for securing the attaching device in the casing, comprising a spring-actuated dog, coacting inclined wall for shifting the dog, a stop, a locking-shoulder with which the dog engages and an inclined releasing-shoulder for the dog, substantially as described.

3. In a holding and releasing device the combination with the casing having a longitudinal channel therein, a movable dog having a locking projection thereon located within the casing, a spring for normally holding the projection at one side of the channel, a sliding securing device having a shank or extension arranged to enter the channel and formed with an inclined wall arranged to engage the locking projection on the dog, a locking-wall with which the projection engages and a releasing-groove arranged in advance of the locking-wall, substantially as described.

4. In a holding and releasing device, the combination with a casing, of an attaching means working therein and a means comprising a spring-actuated dog for stopping and locking the attaching means upon the backward movement thereof, and releasing the same upon a subsequent backward movement, substantially as described.

5. In a checking and unchecking device, the combination with the casing, of a laterally-moving spring-actuated locking-dog within the casing having a locking projection thereon, of a hook having a shank portion arranged to enter the casing and formed with an inclined groove thereon for engaging the locking projection, a locking-shoulder and an escape-groove in advance of the locking-shoulder, substantially as described.

6. In a holding and releasing device, the combination with the casing, of a laterally-movable spring-actuated locking-dog within the casing, the hook or securing device having a shank adapted to enter the casing and formed with an inclined shoulder for engaging with the dog, a locking-shoulder at the end of the inclined shoulder, a curved seat arranged in front of the forward end of the inclined shoulder and a curved passage-way leading to the edge of the shank, substantially as described.

7. In a holding and releasing device, the combination with a stationary member, of a movable member, and movable means actuated upon the movement of the movable member, for stopping and locking the same against forward movement, and unlocking the same upon a subsequent backward movement, substantially as described.

8. The combination with a hook having two perforations in its end portion one arranged in advance of the other and a bent spring-tongue having its opposite ends bent in opposite directions and extended respectively into the perforations, substantially as described.

In testimony whereof we affix our signatures in presence of two witnesses.

LOUIS E. FOURNIER.
SAMUEL E. WINDER.

Witnesses:
E. L. COTHRELL,
A. A. EHRET.